United States Patent [19]
Mushya

[11] Patent Number: 4,883,382
[45] Date of Patent: Nov. 28, 1989

[54] MOUNTING MEMBER

[75] Inventor: Takashi Mushya, Kanagawa, Japan

[73] Assignee: Nifco, Inc., Kanagawa, Japan

[21] Appl. No.: 277,157

[22] Filed: Nov. 29, 1988

[30] Foreign Application Priority Data

Dec. 2, 1987 [JP] Japan ................... 62-184041

[51] Int. Cl.[4] ............................................. B25G 3/00
[52] U.S. Cl. ............................ 403/405.1; 411/182; 24/297; 174/138 D
[58] Field of Search ............... 403/405.1, 408.1; 411/40, 41, 182; 174/138 D; 24/297

[56] References Cited

U.S. PATENT DOCUMENTS

| | | | |
|---|---|---|---|
| 2,936,015 | 5/1960 | Rapata | 411/182 |
| 3,513,509 | 5/1970 | Gross | 411/41 X |
| 4,040,463 | 8/1977 | Petras | 411/182 |
| 4,780,037 | 10/1988 | Payne | 24/297 X |
| 4,781,504 | 11/1988 | Yuta | 403/408.1 X |

Primary Examiner—Andrew V. Kundrat
Attorney, Agent, or Firm—Schwartz & Weinrieb

[57] ABSTRACT

A mounting member for mounting a first member having a mounting hole upon a second member having a stud secured thereto in a state of being spaced apart from the second member includes a stud holder section having a head having a diameter larger than that of the mounting hole and also having an inserting portion extending from the head, having securement means for securing the free end of the stud and being inserted through the mounting hole, and a spacer section having a plurality of legs for clamping the first member in cooperation with the head of the stud holder section and also having a spring portion. When the spring portion is urged toward the stud holder section in the longitudinal direction, it is compressed. When the biasing force is released, the spring portion elastically restores to the initial state. The spacer section is penetrated by the stud and interposed between the first and second members.

13 Claims, 4 Drawing Sheets

FIG. 5
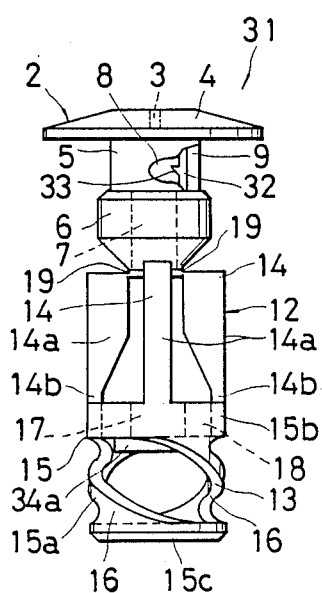
FIG. 6
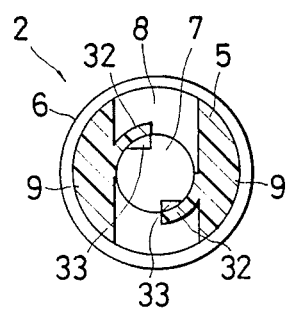
FIG. 7

MOUNTING MEMBER

FIELD OF THE INVENTION

This invention relates to a mounting member used for mounting a first member having a mounting hole upon a second member with a stud secured thereto such that the first member is spaced apart from the second member and, more particularly, to a mounting member which can be suitably used for securing upholstery material or a finishing object to an automobile body panel.

DESCRIPTION OF THE PRIOR ART

Heretofore, upholstery materials and finishing objects have been mounted upon an automobile body panel by mounting means as shown in FIG. 9.

In the Figure, reference numeral 101 designates an automobile body panel, 102 a stud perpendicularly secured to the panel 101 and having an external thread, and 103 a finishing panel or strip having a mounting hole 104. When mounting the finisher 103 on the body panel 101 such that the former is spaced apart from the latter, a substantially cylindrical sponge-like spacer 105 is first mounted upon the stud 102 by inserting the stud 102 into a central bore 106 formed within the spacer 105. Then, the finishing panel or strip 103 is mounted upon spacer 105 such that the free end of the stud 102 extends into the mounting hole 104. Then, a cylindrical inserting portion 108 of a plastic clip 110 is inserted into the mounting hole 104 of the finishing strip or panel 103 from the external side thereof. The plastic clip 110 has a substantially disk-like head 107, and the cylindrical inserting portion 108 integrally depends from the center of the head 107. The inserting portion 108 has its lower inner surface portion formed with a pair of diametrically opposed integral pawls 109 extending obliquely upwardly. By pushing the free end of the stud 102 into the space defined between the pawls 109 against the elasticity thereof, the threaded end of the stud 102 is clamped between the pawls 109. In this way, the clip 110 is secured to the stud 102, whereby the finishing panel or strip 103 is mounted upon the body panel 101.

With this mounting means for mounting the finishing panel or strip 103 upon the automobile body panel 101, after mounting the spacer 105 upon the stud 102, the finishing panel or strip 103 is mounted in position upon the spacer 105, and then the clip 110 is mounted onto the free end of the stud 102. Therefore, the mounting operation is rather cumbersome and requires much time, thus increasing the cost of the product.

OBJECT OF THE INVENTION

An object of the invention is to provide an economical mounting member, which can reduce the number of steps involved in the mounting operation and thus reduce the time required for performance of the mounting operation.

SUMMARY OF THE INVENTION

To attain the above object of the invention, there is provided a mounting member for mounting a first member having a mounting hole upon a second member with a stud secured thereto such that the first member is spaced apart from the second member, comprising a stud holder section including a stem portion having a head having a greater diameter than the mounting hole of the first members and an inserting portion extending from the head, to be inserted through the mounting hole of the first member and provided with securement means for engaging the free end of the stud, and a spacer section including a stem portion having a plurality of legs for cooperating with the head of the stud holder section so as to clamp the first member therebetween, and a free end portion having a spring portion capable of being compressed when urged in the longitudinal direction and elastically restoring itself to the initial state when the urging force is removed, the spacer section being capable of being penetrated by the stud and being interposed between the first and second members.

With the mounting member having the above construction according to the invention, the first member can be easily mounted upon the second member by fitting the spacer section upon the stud so as to interpose it between the first and second members and mounting the stud holder section within the mounting hole of the first member so as to secure the free end of the stud to the inserting portion of the stud holder section while clamping the first member between the head of the stud holder section and the legs of the spacer section. In this case, since the spring portion of the spacer section is capable of being compressed in the longitudinal direction and of elastically restoring itself to the initial state, large allowances can be provided for the thicknesses of the first and second members and the distance therebetween. In addition, the spacer section can reliably function as a spacer. Furthermore, the portion of the first member surrounding the mounting hole can be stably clamped between the head of the stud holder section and the legs of the spacer section.

BRIEF DESCRIPTION OF THE DRAWINGS

The above and other objects and features of the invention will become more apparent from the following detailed description with reference to the accompanying drawings, wherein:

FIG. 5 is a front view showing a second embodiment of the mounting member according to the invention;

FIG. 6 is a side view showing the mounting member of FIG. 5;

FIG. 7 is a sectional view taken along line VII—VII in FIG. 5;

DETAILED DESCRIPTION OF THE PREFERRED EMBODIMENT

Figure 1:
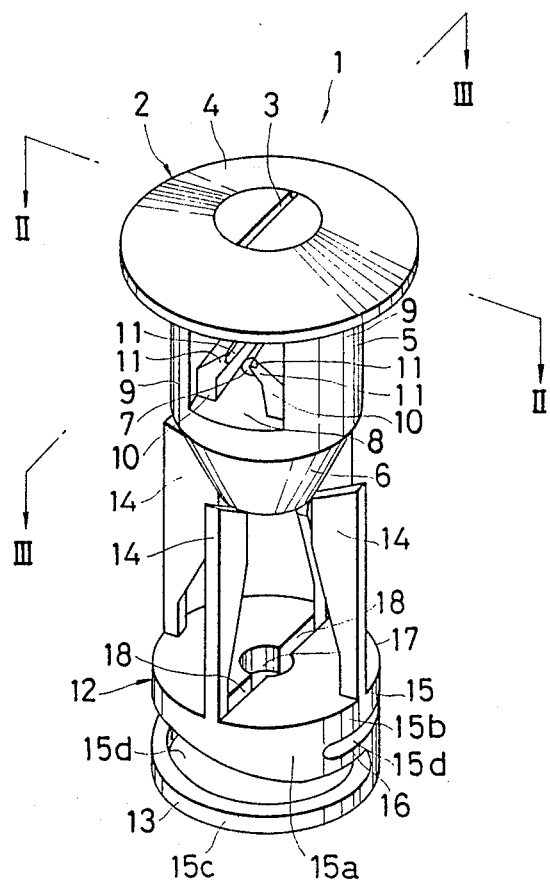
FIG. 1 is a perspective view showing a first embodiment of the mounting member according to the invention.
Figure 2:
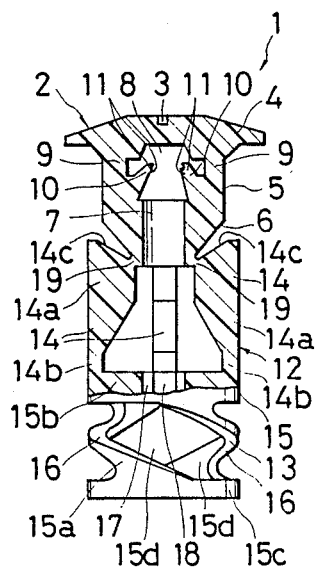
FIG. 2 is a sectional view taken along line II—II in FIG. 1.
Figure 3:
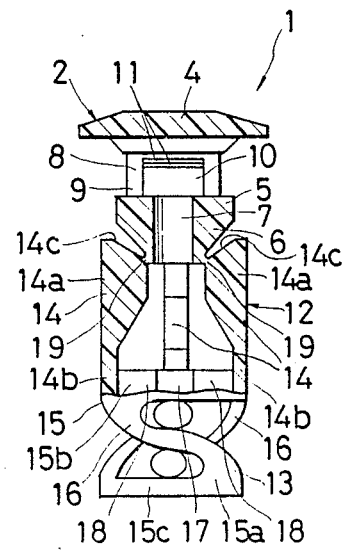
FIG. 3 is a sectional view taken along line III—III in FIG. 1.

FIGS. 1 to 4 show a first embodiment of the mounting member according to the invention. This mounting member 1 is fabricated as a plastic one-piece molding. In this embodiment, the mounting member 1 is used to mount an upholstered member or finishing panel upon automobile body panel. It comprises a stud holder section 2 and a spacer section 12.

The study holder section 2 has a disk-like head 4 with a screw driver insertion groove 3 formed within the central upper surface center portion thereof, a cylindrical upper inserting portion 5 depending from the center of the lower surface of the head 4, and a lower inserting portion 6 having an inverted conical shape extending from the lower end of the lower inserting portion 5. The upper inserting portion 6 has a portion thereof cylindrical axial stud insertion bore 7 having a diameter slightly greater than the diameter of a stud 23 as will be described later, and it also has a broad radial rectangular hole 8 communicating with the stud insertion bore 7, which defines a pair of diametrically opposed, substantially rectangular walls 9. Lower portions of the inner surfaces of the walls 9 are provided with respective integral rectangular pawls 10 extending obliquely upwardly toward each other. The free ends of the pawls 10 are spaced apart by means of a distance smaller than the diameter of the stud 23. The free ends of the opposed pawls 10 have respective parallel ridges 11 extending in their width direction. When the stud 23 is inserted into the space between the pawls 10, its thread engages with the ridges 11.

The spacer section 12 has a spring portion 13 and four legs 14 integrally extending from the top of the spring portion 13. The spring portion 13 consists of a cylindrical base 15 having an outer diameter greater than the outer diameter of the upper inserting portion 5 of the stud holder section 2. The outer peripheral wall 15a of the base 15 is formed with two helical notches 15d such that its upper and lower ring-like portions 15b and 15c are united to each other by means of two helical spring parts 16. When the lower ring-like portion 15c is urged toward the upper ring-like portion 15b, the spring parts 16, that is, spring portion 13, are axially compressed as the lower ring-like portion 15c proceeds toward the upper ring-like portion 15b. When the biasing force is released, the spring parts 16 elastically restore to their initial states, thus causing the lower ring-like portion 15c to be restored to its initial position. The upper ring-like portion 15b of the base 15 has a central circular hole 17 having a diameter slightly greater than the diameter of the stud 23, and it is also formed with a pair of rectangular notches 18 communicating with and extending in opposite directions from the circular hole 17.

The legs 14 each have a substantially trapezoidal plate-like main portion 14a and a bar-like coupler portion 14b extending integrally downwardly from the main portion 14a. Furthermore, they each have an inclined upper end surface 14c inclined obliquely upwardly in the outward direction. They extend integrally upright from the spring portion 13 with the lower ends of their coupler portions 14b uniformly spaced apart along the edge of the upper surface of the upper ring-like portion 15b.

The upper end of the inner edge of each of the legs 14 is united via by means of a reduced-thickness portion 19 to the edge of the lower end of the lower inserting portion 6 of the stud holder section 2. When the stud holder section 2 is urged toward the spring portion 13 against the biasing force thereof so as to compress the spring portion 13, the reduced-thickness portions 19 are broken or fractured by means of tensile force produced by means of biasing the stresses, thus breaking the mounting member 1 into the stud holder section 2 and spacer section 12. At the same time, the lower inserting portion 6 of the stud holder section 2 is inserted into the space defined by means of the legs 14. The lower inserting portion 6 proceeds into the space defined by means of the legs 14 while biasing the upper end of the inner edge of each of the legs 14 radially outwardly by means of its tapered outer periphery, whereby the legs 14 are flexed outwardly away from one another. In the state wherein the legs 14 remain united by means of the reduced-thickness portions 19 to the stud holder section 2, the upper end of the outer edge of each of the legs 14 projects outwardly from the outer periphery of the upper inserting portion 5 of the stud holder section 2.

Figure 4:
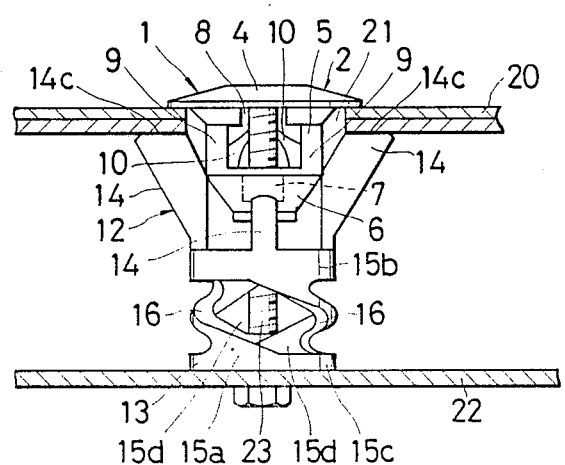
FIG. 4 is a side view, partly in section, showing the mounting member of FIG. 1 in the state of mounting an upholstery member of a finishing panel upon an automobile body panel.

When mounting the upholstered member or the like upon an automobile body panel by using the mounting member 1, first the member 20 is formed with a circular mounting hole 21 having substantially the same diameter as the outer diameter of the upper ring-like portion 15b of the spring portion 13. Then, the member 20 is disposed at a predetermined position. In this state, the spacer section 12 of the mounting member 1 is inserted through the mounting hole 21 of the member 20 from the external side thereof, while inserting the stud 23 extending from the body panel 22 through the lower ring-like portion 15c and circular hole 17 of the spring portion 13. In this state, the stud holder section 2 is pushed toward the body panel 22. As a result, the lower ring-like portion 15c of the spring portion 13 strikes the panel 22, and the spring parts 16 are flexed by means of the biasing force, so that the spring portion 13 is axially compressed. As the stud holder section 2 is pushed further, the spring parts 16 are flexed to the limit, whereupon the reduced-thickness portions 19 are broken, that is, the mounting member 1 is broken into the stud holder section 2 and spacer section 12. As a result, the lower inserting portion 6 proceeds through the space defined by means of the legs 14, thereby biasing the legs 14 away from one another. Eventually, the free end of the stud 23 clears the stud insertion bore 7 of the stud holder section 2 so as to be inserted between the pawls 10. The thread of the stud 23 is thus engaged with the ridges 11 of the pawls 10, whereby the stud 23 is clamped between the pawls 10. In this way, the stud 23 is secured to the stud holder section 2. At the same time, the spring parts 16 are elastically restored to their initial state, and the spring portion 13 is axially elongated again. At this time, the legs 14 are raised while being flexed outwardly by means of the lower inserting portion 6 of the stud holder section 2. As soon as the tapered upper end surface 14c of each of the legs 14 is brought into contact with the lower surface of the member 20, the legs 14 are no longer raised, and the member 20 is clamped between the head 4 and the tapered surfaces 14c. Thus, the member 20 is secured to the panel 22, as shown in FIG. 4. In this case, since in this embodiment of the mounting member 1 the force required to cause breaking of the reduced-thickness portions 19 is set to be greater than the force required to bring the upper end of each of the legs 14 to a position radially inwardly of the mounting hole 21 of the member 20 by causing flexing of the spring portion 13, there is no undesired possibility of breaking of the reduced-thickness portions 19 before the upper end of each leg 14 is brought to the position radially inwardly of the mounting hole 21. In addition, the pawls 10 provide a greater retaining force to retain the stud 23 than the force with which the stud is inserted. Thus, the stud 23 clamped between the pawls 10 is safe from detachment from the pawls 10.

To remove the member 20 from the body panel 22, the stud holder section 2 is turned with by means of a screwdriver with the tip thereof inserted within the groove 3. By so doing, the pawls 10 are caused to rotate about the periphery of the stud 23 so as to cause the stud holder section 2 to be raised, so that the stud 23 is detached from the pawls 10.

It will be appreciated that with this embodiment of the mounting member 1 it is possible to easily mount the member 20 upon the body panel 22 and in a short period of time by means of a single operation of a one-piece member in a single direction (that is, from the external side of the member 20). It is also possible to reduce the cost of the product. Furthermore, since the spring portion 13 is provided with the spring parts 16 capable of compression and elastic restoration, large allowances can be provided for the thickness of the member 20 and the distance between the member 20 and body panel 22. That is, the member 20 and panel 22 can be reliably secured to each other even if there are fluctuations within allowable limits in the thickness and distance parameters as noted above. In addition, when a strong force is exerted upon the member 20, the consequent shock can be absorbed by means of the spring portion 13 so as to prevent damage to the member 20 and to the mounting member 1. Still further, it is possible to raise the stud holder section 2 and remove the section 2 from the stud 23 by turning the section 2 using a screwdriver or the like. Thus, it is possible to control the force, with which the member 20. is mounted upon the panel 22, or to remove the mounting member 1 so as to remove the member 20 from the panel 22 and then re-use the mounting member 1.

FIGS. 5 to 7 show a second embodiment of the mounting member according to the invention. This mounting member, like the preceding embodiment, is a plastic one-piece molding and is used to mount an upholstered member or the like upon an automobile body panel. In FIGS. 5 to 7, parts like those in FIGS. 1 to 4 are designated by like reference numerals and will not be described again.

In this embodiment of the mounting member 1, the substantially rectangular opposed walls 9 of the upper inserting portion 5 have their inner surfaces provided with respective integral curved rectangular blade-like portions 32 extending in the circumferential direction of the stud insertion bore 7. The blade-like portions 32 have their inner surfaces provided substantially in a central portion thereof with respective integral, substantially conical projections 33 which face each other.

Furthermore, in this embodiment, one pair of opposed legs 14 each has the inclined upper end surface 14c extending obliquely upwardly in the outward direction. The other two legs 14, however, each have an upper end surface which is disposed paralled to the lower surface of the head 4. Furthermore, the lower end surface of the upper ring-like portion 15b of the spring portion 13 is provided with a pair of integral semi-circular projections 34a and 34b extending along the circular hole 17 and facing each other.

Figure 8:
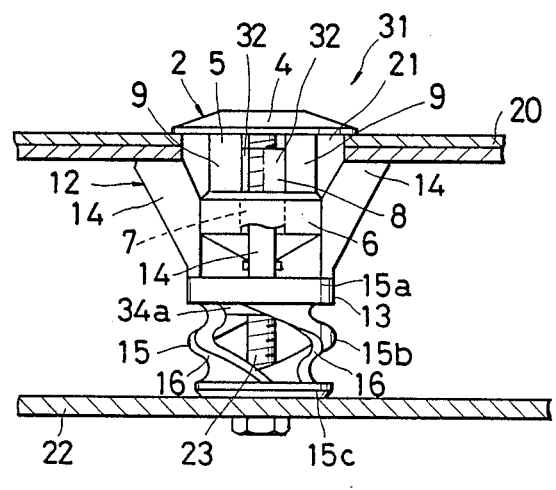
FIG. 8 is a side view, partly in section, showing the mounting member of FIG. 5 in the state of mounting an upholstered member or a finishing panel upon an automobile body panel.
Figure 9:
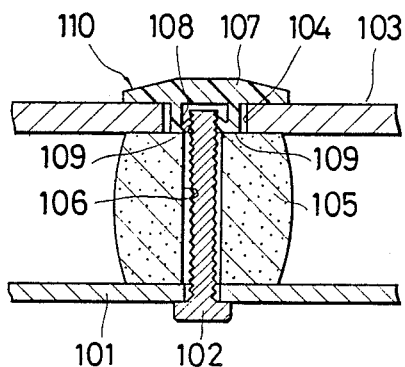
FIG. 9 is a sectional view showing a prior art mounting member in the state of mounting an upholstered member or a finishing panel upon an automobile body panel.

This embodiment of the mounting member is used in the same way as the previous embodiment. In this embodiment, when the free end of the stud 23 enters the upper inserting portion 5 through means of the stud insertion bore 7 of the stud holder section 2, the ends of the projections 33 are received within the valleys defined between adjacent thread turns of the stud 23, whereby the stud 23 is clamped between the blade-like portions 32, that is, the stud 23 is secured to the stud holder section 2 as shown in FIG. 8. In this case, since the force with which the stud 23 is inserted between the blade-like portions 32 is set to be less than the force of retaining the stud 23, the stud 23 once clamped between the blade-like portions 32 is safe from detachment from the portions 32. The rest of the construction, operation and effect of this embodiment is the same as those of the first embodiment and will not be described again. The shape of the stud holding section, structure of the legs of the spacer section and structure of the spring portion in this embodiment are by no means limitation and may be suitably changed depending upon the shapes of the first and second members and mounting hole. other structures may also be suitably changed without departing from the scope of the invention.

As has been described in the foregoing, the mounting member according to the invention permits coupling of a first member and a second member with a stud secured thereto such that the two members are properly spaced apart and the coupling procedure can be accomplished by means of a single operation. Thus, it is possible to reduce the number of steps involved and the time for performing the mounting operation so as to permit cost reduction of the product. Furthermore, since the spacer section of the mounting member according to the invention is provided with a spring section capable of compression in the longitudinal direction and elastic restoration, large allowances can be provided for the thicknesses of the first and second members and the defined therebetween. Still further, the spacer section can function satisfactorily as a spacer, the portion of the first member surrounding the mounting hole can be reliably clamped between the head of the study holder section and the legs of the spacer section, and shocks to the first member can be absorbed so that the two members can be reliably retained in their coupled state.

Obivously, many modifications and variations of the present invention are possible in light of the above teachings. It is therefore to be understood that within the scope of the appended claims, the present invention may be practiced otherwise than as specifically described herein.

What is claimed is:

1. A mounting member for mounting a first member, having a mounting hole, upon a second member, with a stud secured thereto, such that said first member is spaced apart from said second member, comprising:
    a stud holder section including a stem portion, having a head having a greater diameter than said mounting hole of said first member; and an inserting portion extending from said head, to be inserted through said mounting hole of said first member, and provided with securement means for securing a free end portion of said stud; and
    a spacer section including a stem portion having a plurality of legs for cooperating with said head of said stud holder section so as to clamp said first member therebetween, and a free end portion having a spring portion capable of being compressed when urged in a longitudinal direction by means of a biasing force and of elastically restoring to its initial non-compressed state when said biasing force is removed, said spacer section being capable of being penetrated by said stud and being interposed between said first and second members.

2. The mounting member according to claim 1, wherein said stud holder section and spacer section are united to each other by means of a plurality of reduced-thickness portions.

3. The mounting member as set forth in claim 2, wherein:
said reduced-thickness portions comprise frangible means, for frangibly connecting said stud holder section and said spacer section together, which will fracture in response to a predetermined value of said biasing force.

4. The mounting member as set forth in claim 1, wherein:
said stud has thread means formed upon an external peripheral surface portion thereof; and
said securement means of said inserting portion of said stud holder section comprises radially inwardly directed pawls for engaging said thread means of said stud.

5. The mounting member as set forth in claim 1, wherein:
said inserting portion of said stud holder section and plurality of legs of said spacer section have complimentary inclined surface portions such that when said inserting portion of said stud holder section is moved in said longitudinal direction by means of said biasing force, said inclined surface portions of said inserting portion of said stud holder section will engage said inclined surface portions of said plurality of legs of said spacer section so as to radially expand said plurality of legs of said spacer section radially outwardly so as to cooperate with said head of said stud holder section and thereby clamp said first member therebetween.

6. The mounting member as set forth in claim 1, wherein:
said mounting member comprises a one-piece plastic molding.

7. The mounting member as set forth in claim 1, further comprising:
groove means defined within said head of said stud holder section for receiving a torque tool for rotating said stud holder section relative to said spacer section whereby said securement means of said stud holder section can be disengaged from said stud.

8. The mounting member as set forth in claim 4, further comprising:
groove means defined within said head of said stud holder section for receiving a torque tool for rotating said stud holder section relative to said spacer section whereby said securement pawls of said stud holder section can be threadedly disengaged from said thread means of said stud.

9. The mounting member as set forth in claim 1, wherein:
said spring portion of said spacer section comprises a pair of helical springs integrally formed with said spacer section.

10. The mounting member as set forth in claim 1, further comprising:
through-hole means coaxially defined within said inserting portion of said stud holder section and said spring portion of said spacer section for reception of said stud.

11. The mounting member as set forth in claim 1, wherein:
said stem portion of said spacer section comprises four legs equally spaced about said mounting member in a circumferential direction.

12. The mounting member as set forth in claim 4, wherein:
said radially inwardly directed pawls extend circumferentially about a longitudinal axis of said mounting member extending in said longitudinal direction.

13. The mounting member as set forth in claim 8, wherein:
said radially inwardly directed pawls extend circumferentially about a longitudinal axis of said mounting member extending in said longitudinal direction.

* * * * *